United States Patent [19]

Schrepel

[11] 4,434,509
[45] Feb. 28, 1984

[54] TRANSISTORIZED RADIO RECEIVER COMBINATION WITH MALE POWER INPUT AND FEMALE POWER OUTPUT CONNECTIONS

[75] Inventor: William J. Schrepel, Alexandria, Va.

[73] Assignee: PBS Associates, Alexandria, Va.

[21] Appl. No.: 410,903

[22] Filed: Aug. 24, 1982

[51] Int. Cl.³ .......................... H04B 1/08; H04B 1/16
[52] U.S. Cl. .................................... 455/343; 455/344; 455/351
[58] Field of Search .............. 455/343, 344, 351, 142, 455/154, 155, 157

[56] References Cited

U.S. PATENT DOCUMENTS

| | | | |
|---|---|---|---|
| 2,175,603 | 10/1939 | Hartmann | 455/344 |
| 2,179,118 | 11/1939 | DeWitt et al. | 455/334 X |
| 2,264,696 | 12/1941 | Jackson | 455/343 |
| 2,771,559 | 11/1956 | Montmeat | 455/343 X |
| 2,934,639 | 4/1960 | Salisbury | 455/351 |
| 2,988,655 | 6/1961 | Rudolph et al. | 361/334 X |
| 3,611,151 | 10/1971 | Fernandez | 455/344 X |
| 3,824,472 | 7/1974 | Engel et al. | 455/344 |

Primary Examiner—Marc E. Bookbinder
Attorney, Agent, or Firm—Robert Halper

[57] ABSTRACT

A light weight portable transistorized radio receiver having male outlets in the rear and female outlets in the front. The male outlets plug directly into a standard A.C. electrical energy source and the female outlets are adapted to receive connections from an assortment of electrical appliances.

4 Claims, 5 Drawing Figures

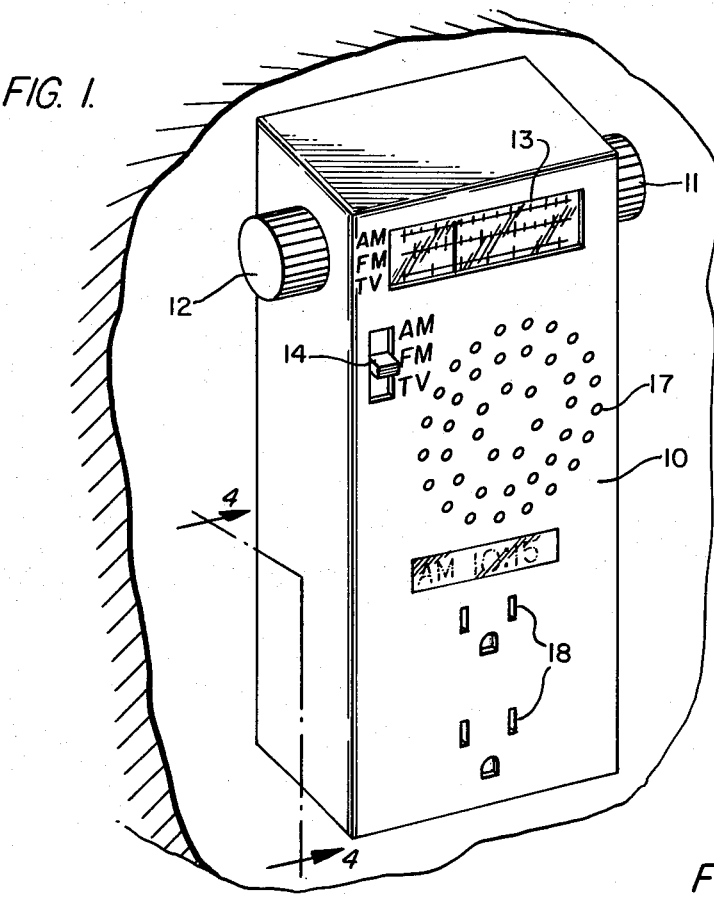
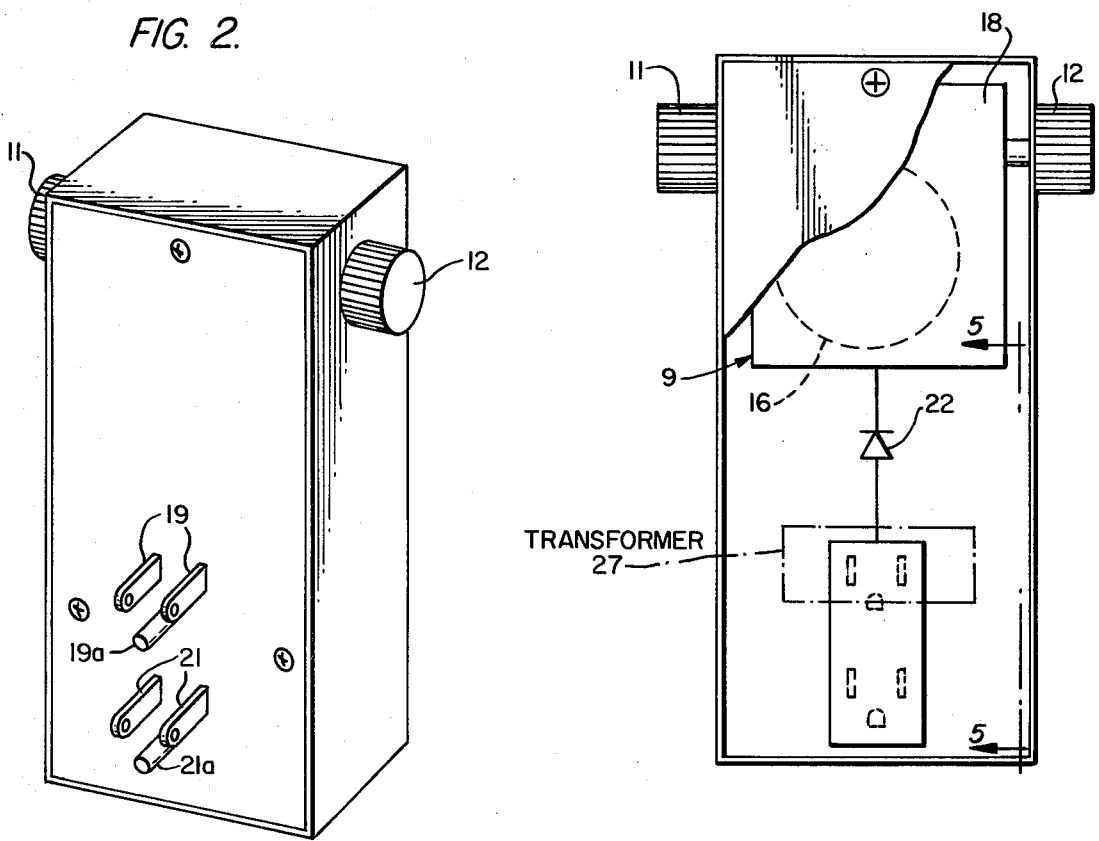

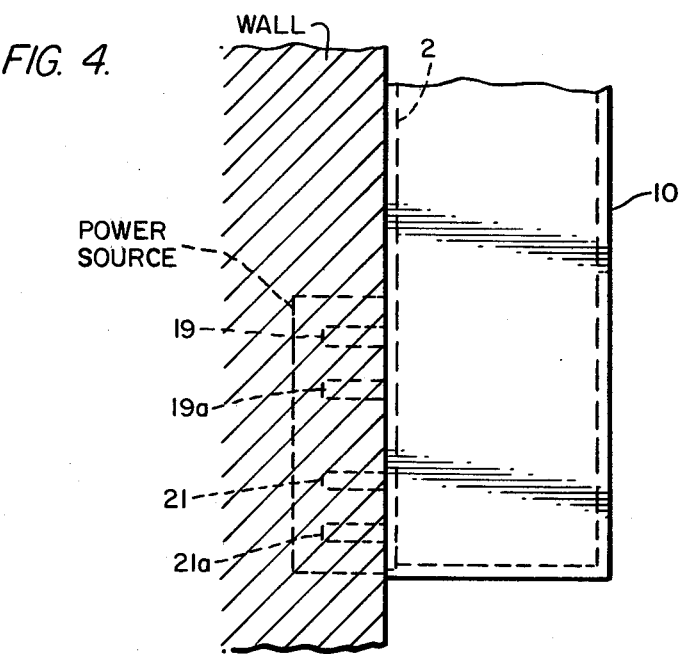
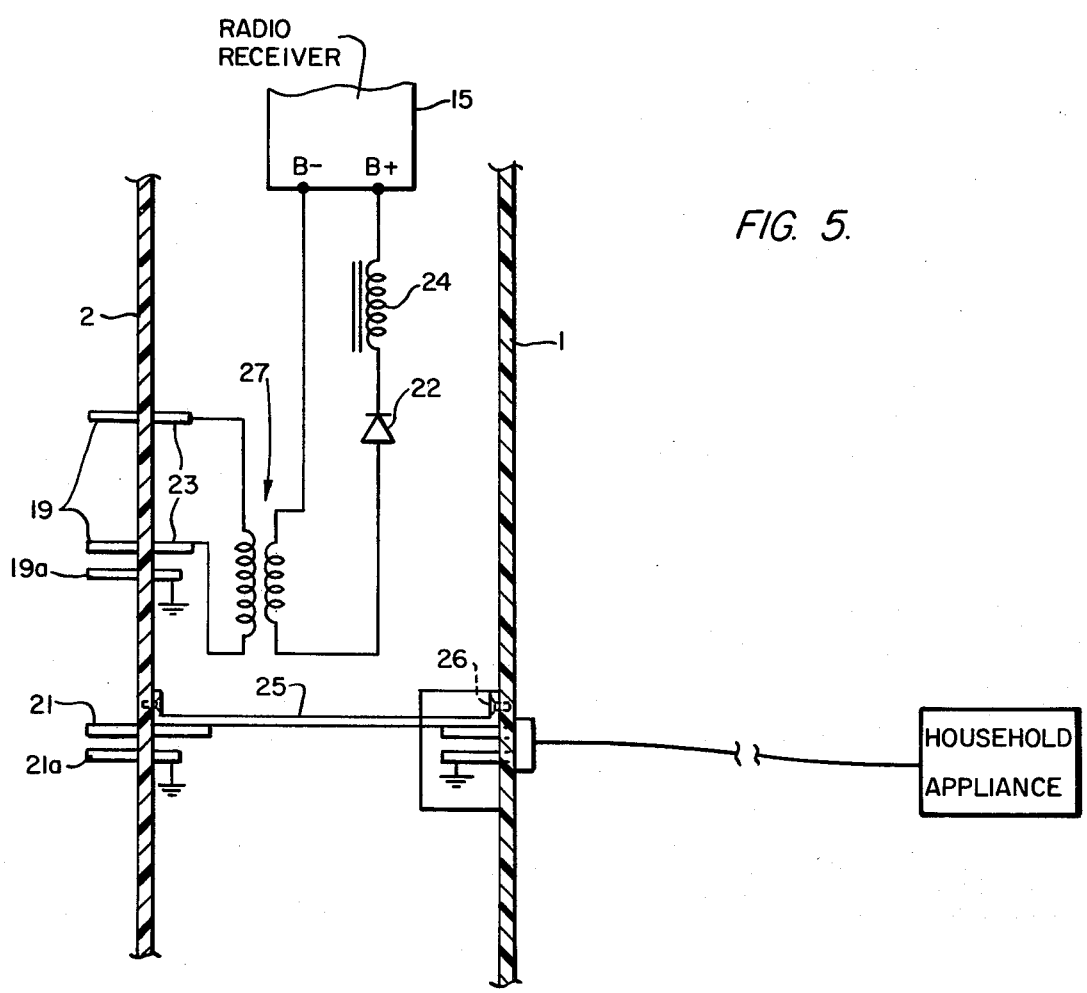

TRANSISTORIZED RADIO RECEIVER COMBINATION WITH MALE POWER INPUT AND FEMALE POWER OUTPUT CONNECTIONS

BACKGROUND OF THE INVENTION

This invention relates to the use of radios in combination with household appliances. More particularly the invention has to do with a portable light weight transistorized radio receiver that is designed to be directly connected to a conventional A.C. energy source and connect household appliances to the electrical output therefrom.

Portable transistorized radios have been in vogue for a number of years. Moreover, there have been produced for the market various radio combinations, such as the clock radio with tape player of U.S. Pat. No. 3,611,151. This patent teaches a single cabinet for housing an electric alarm clock, a radio and a cartridge type tape as well as a speaker and selective switching means. This unit differs from the invention not only functionally but also structurally. It is not portable, the radio per se is not connected to the power source and the radio is connected selectively by switching means. Another interesting combination is that of U.S. Pat. No. 2,771,559 which teaches a portable clock radio, wherein the clock plugs into an electrical energy source and can be electrically connected to a radio receiver by plugs mounted on the side of the clock which are inserted in receptacles in the corresponding side of the receiver. The receiver is also independently operable by batteries. This unit while portable is limited to the use of a clock which itself is indirectly connected to an electrical power source. The radio is not of the transistorized type and does not provide a power source to operate appliances independently of its associated clock.

A more pertinent patent related to this invention is U.S. Pat. No. 2,179,118. The patent is directed to the use of an electrical adapter. A radio receiver is coupled to a car battery and an adapter with outlet is indirectly connected to the radio for receiving household appliances operable at 110 volts. This patent of course is very limited in its application since the receiver is for car use. The receiver is not transistorized, nor portable nor directly connected to an A.C. power source.

U.S. Pat. No. 2,934,639 teaches the use of a radio receiver directly mounted to an outlet in the wall. Unlike applicant's device however, this radio receiver is not of the transistorized type, does not use a transformer to operate at low voltage nor is a double three pronged device used for attaching directly to the wall outlet. Additionally the patentee's main objective was to preset the frequency of the receiver to receive only one station. The manner of supporting the receiver of the patentee is considerably different. Whereas applicant uses a supporting grounding prong which also satisfies the requirements of the Electrical Code in most areas, the patentee resorts to a projection at one end of the block, the other end of which contains the prongs. Finally the patentee had no conception of using the radio receiver for an additional purpose such as attachment of household appliances.

U.S. Pat. No. 2,988,655 is of interest in that it shows a portable distributor box wherein a plurality of male prongs are connected to source of A.C. Power and a plurality of female outlets can be connected to a desired unit for receiving such power. This device is not concerned with radios having male outlets or female outlets and has to do with allocation of measured amounts of power. Furthermore, there are only two prongs in the male input terminal, and these are in recesses.

SUMMARY OF THE INVENTION

Accordingly a primary object of this invention is to provide a lightweight portable transistorized radio receiver which plugs directly into a wall socket and which further enables a user at the same time to avail himself of the use of a household appliance that can be electrically connected to the receiver.

An additional object of this invention is to provide a portable transistorized radio receiver in combination with input and output connections that enable a user to plug directly into a wall socket, thus conserving counter space and allowing the user to plug in household appliances into the receiver.

A further object is to enable a portable light weight radio receiver having selective capabilities for AM, FM & TV audio to be plugged directly into a wall outlet and to be easily supported therein without resorting to a specialized structure and at the same time satisfies the electrical Code requirements as regards ground connections.

Other objects and advantages of this invention will be apparent from a consideration of the following description and attached drawings.

The objects of this invention are achieved in short by providing a lightweight portable transistorized radio with at least two spaced terminal inputs on its rear which plug directly into any available wall socket as an electrical energy source and at least two female terminal outputs on its front which are adapted to engage sundry household appliances such as electric iron, hair curler, electric razor, dental equipment, etc.

BRIEF DESCRIPTION OF THE FIGURES

FIG. 1 is a frontal perspective view of the Radio Receiver combination.

FIG. 2 is a rear perspective view of the same.

FIG. 3 is a rear view of the Receiver partially cut away.

FIG. 4 is a sectional view taken along line 4—4 in FIG. 1.

FIG. 5 is a sectional view taken along line 5—5 in FIG. 3.

DETAILED DESCRIPTION OF THE INVENTION

With reference to FIG. 1 there is shown the front of a radio receiver assembly 9 which is housed in a moldable plastic case 10. The housing is generally rectangular and comprises a front 1 and a rear 2. A frequency station selector knob 11 is located on its upper right side and an on/off switch and volume control 12 on its upper left side as viewed from the front. Between the two knobs on the upper front is a three band station indicator 13 and a selector switch 14 adapted for AM/FM/TV-FM MODE. Mounted between the upper ends of the plastic case 10 is a transistorized lightweight Radio Receiver 15 including a speaker 16. The Schematic for this type receiver is conventional. For example, see Electronic Design, December 1954. If desired, a digital clock can also be included and mounted as shown in FIG. 1. The exterior front of the case contains a series of radially oriented perforations 17 aligned and adjacent the speaker. Near the lower front end are positioned two axially spaced female output terminals 18. Each terminal contains three triangular spaced openings two of which receive two prongs from a 3-prong plug of an electrical household appliance such as a hair dryer, curler, dental equipment, etc. and a third opening receives a ground prong and is itself connected to ground. Aligned with these female terminals 18 and mounted on the rear, as shown in FIG. 2, are two axially spaced male input terminals (19,19a) and (21,21a). As seen in FIGS. 2 and 4, each input terminal comprises three triangular spaced prongs, two of which plug directly into a sidewall socket, which is the source of electrical energy at 110–120 volts A.C. and the third prong is connected to ground. Additionally the third prong of both input terminals assures greater support for the receiver assembly and prevents the same from pulling away from the wall outlet. FIG. 3 shows a rear partial sectional view of the assembly wherein the upper of the male input terminals is electrically connected to a step-down transformer 27 designed to operate at 9 volts and a diode 22 for rectifying the A.C. power to D.C. FIG. 5 is a section taken on line 5—5 of FIG. 3 showing the wiring between the respective input and output terminals as well as the wiring between the upper input terminal and the radio receiver. The rear ends of prongs 19 in the upper input terminal have extensions 23 which are soldered to the primary of the step-down transformer. In FIG. 5, prongs 19 are shown one above the other only to clearly illustrate their connections to the primary of transformer 27. Prongs 19a and 21a are connected to ground. A diode is serially connected to the secondary of the step-down transformer followed by a filter choke coil 24 for steadying the current connected to the B+ terminal of the radio receiver. The rear ends of the two lower prongs 21 are wired to respective U shaped connectors 25 that are threadably mounted to the respective rear of the case by screws 26.

The operation of the radio receiver combination is readily apparent. Whenever a user desires to listen to a program while at the same time dry his hair or shave, he simply carries the radio to a wall outlet, plugs in the same and connects a household appliance to the female output terminal. This type of device is especially convenient for people who travel and stay in hotels, motels, campers, or dormitory rooms with limited desk space.

From the above description it can be seen that this invention satisfies a long felt need of providing a simple device readily adaptable to the house, motel, and camper for enabling a user to perform dual functions simultaneously.

What is claimed is:

1. A portable lightweight transistorized radio receiver, housed in a plastic casing having a front and a rear, at least two axially spaced male A.C. power input terminals mounted on said rear and at least two female axially spaced A.C. power output terminals mounted on said front and aligned with said terminals on the rear, said radio receiver comprising a 3 band station indicator and a selector switch for FM/AM/TV-FM Mode, said radio receiver being mounted in an upper region of the casing, a step down transformer mounted in the lower region of the casing and electrically connected to a diode and a filter choke in series with a D.C. power input of said receiver, said input terminals each comprising three prongs including a grounding prong, said output terminals each comprising three slots including a grounded slot for receiving these prongs of a male A.C. power input plug of an electrical household appliance including a grounding prong, one of said input terminals being electrically connected to the primary of the transformer and another of said input terminals electrically connected to an output terminal.

2. The receiver of claim 1 wherein the upper of said axially spaced input terminals is connected to said transformer by inner extensions of said male prongs.

3. The receiver of claim 1 wherein the lower of said axially spaced input terminals is connected to said output terminal by U-shaped conductors threadably connected to the casing.

4. The receiver of claim 1 wherein said household appliance comprises an iron, a hair curler, a razor, hair dryer, or dental device.

* * * * *